US009170668B2

(12) United States Patent
Schneider et al.

(10) Patent No.: US 9,170,668 B2
(45) Date of Patent: Oct. 27, 2015

(54) ULTRASONIC TOUCH SENSOR WITH A DISPLAY MONITOR

(71) Applicant: QUALCOMM Incorporated, San Diego, CA (US)

(72) Inventors: John K. Schneider, Snyder, NY (US); Jack C. Kitchens, Tonawanda, NY (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 13/758,670

(22) Filed: Feb. 4, 2013

(65) Prior Publication Data

US 2013/0201134 A1    Aug. 8, 2013

Related U.S. Application Data

(60) Provisional application No. 61/594,330, filed on Feb. 2, 2012.

(51) Int. Cl.
*G06F 3/041* (2006.01)
*G06F 3/043* (2006.01)

(52) U.S. Cl.
CPC .............. *G06F 3/041* (2013.01); *G06F 3/043* (2013.01); *G06F 3/0412* (2013.01)

(58) Field of Classification Search
None
See application file for complete search history.

(56) References Cited

U.S. PATENT DOCUMENTS

| 6,313,829 | B1 | 11/2001 | Tolt et al. | |
|---|---|---|---|---|
| 7,683,323 | B2* | 3/2010 | Kymissis | 250/338.3 |
| 7,856,883 | B2 | 12/2010 | Chang et al. | |
| 8,201,739 | B2 | 6/2012 | Schneider et al. | |
| 8,576,202 | B2* | 11/2013 | Tanaka et al. | 345/177 |
| 2002/0135708 | A1* | 9/2002 | Murden et al. | 349/19 |
| 2003/0174870 | A1 | 9/2003 | Kim et al. | |
| 2005/0134579 | A1 | 6/2005 | Hsieh et al. | |
| 2007/0176907 | A1* | 8/2007 | Ishii | 345/177 |
| 2008/0037372 | A1 | 2/2008 | Schneider et al. | |
| 2010/0013797 | A1 | 1/2010 | Kim et al. | |
| 2010/0225600 | A1 | 9/2010 | Dai et al. | |
| 2011/0279662 | A1 | 11/2011 | Schneider et al. | |

FOREIGN PATENT DOCUMENTS

| KR | 1020100008704 A | 1/2010 |
|---|---|---|
| KR | 1020110113547 A | 10/2011 |
| KR | 1020110123619 A | 11/2011 |
| KR | 1020110130372 A | 12/2011 |

OTHER PUBLICATIONS

International Search Report and Written Opinion—PCT/US2013/024627—ISA/EPO—May 10, 2013 (132093WO).
Supplementary European Search Report—EP13744179—Search Authority—Berlin—Jul. 31, 2015.

* cited by examiner

*Primary Examiner* — Jason Olson
(74) *Attorney, Agent, or Firm* — Hodgson Russ LLP

(57) ABSTRACT

A touch screen monitor having a display monitor and an ultrasonic device. The ultrasonic device may include a sensor array using piezoelectric sensors to detect the surface topology of a biological or other object that is in contact with a surface of the display monitor. The display monitor may be a LCD or LED monitor.

33 Claims, 4 Drawing Sheets

ULTRASONIC TOUCH SENSOR WITH A DISPLAY MONITOR

CROSS-REFERENCE TO RELATED APPLICATION

This application claims the benefit of priority to U.S. provisional patent application Ser. No. 61/594,330, filed on Feb. 2, 2012.

FIELD OF THE INVENTION

The present invention relates to devices and methods of collecting information about an object that is in contact with a display.

BACKGROUND OF THE INVENTION

In the prior art, touch screen monitors are commonly used to assist users with selecting items displayed on a monitor. Selecting items is commonly performed using a pointing object, such as a stylus or a finger. Such touch screen monitors often employ a capacitance sensor to identify the location at which the pointing object touches the display monitor. The identified location is then compared to the location of images displayed on the monitor in order to determine what the user is identifying.

Although these prior art touch screen monitors have become reliable and inexpensive, the prior art devices do not incorporate any built-in sensing elements suitable for measuring a touch event reliably, and although many of these prior art devices are fine for dry and clean environments, they often fail in dirty, wet or adverse conditions.

SUMMARY OF THE INVENTION

The invention may be embodied as a touch screen display having a display monitor for providing a visual image, and an ultrasonic device able to emit an ultrasonic energy wave, and able to detect reflected ultrasonic energy. The display monitor may include light emitting diodes for providing the visual image, or a liquid crystal display for providing the visual image.

The ultrasonic device may include a piezoelectric transmitter for emitting the ultrasonic energy wave. Also, the ultrasonic device may include a piezoelectric detector, such as a hydrophone array, for detecting reflected ultrasonic energy. The detector may include a thin-film transistor receiver for detecting reflected ultrasonic energy.

The display monitor may be comprised of layers of components, and the ultrasonic device may be comprised of at least one layer. The ultrasonic device may be attached to one or more of the display monitor layers.

The ultrasonic device may include a plurality of receivers for detecting reflected ultrasonic energy. In one embodiment of the invention, each ultrasonic energy receiver is located among elements of the display monitor comprising a pixel.

BRIEF DESCRIPTION OF THE DRAWINGS

For a fuller understanding of the nature and objects of the invention, reference should be made to the accompanying drawings and the subsequent description. Briefly, the drawings are.

Figure 1:
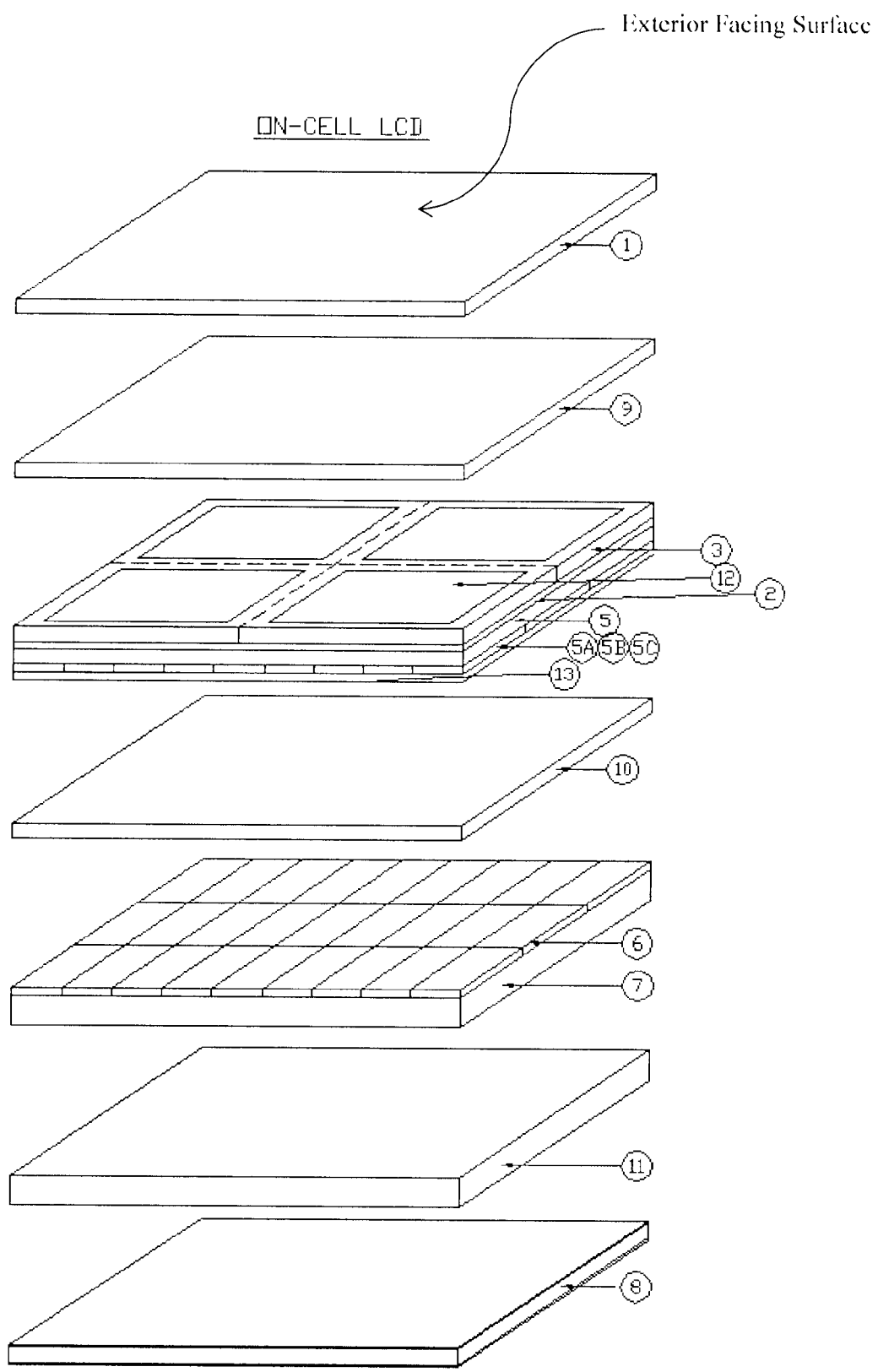
FIG. 1, which is an exploded view of a device in which an on-cell ultrasonic device has been integrated into a backlit LCD display monitor to create a touch screen display according to the invention.

In the drawings, the following reference numbers can be found, and they represent:
1 scuff resistant glass
2 continuous electrode (e.g. TCF (transparent conductive film, such as IZO, ITO, etc.)
3 PVDF or PVDF-TrFE piezoelectric polymer
5 color filter glass (5A, 5B and 5C are simple the 3 RBG color filters within the glass)
6 TFT (Thin Film Transistor) circuit
7 TFT substrate (e.g. glass)
8 piezoelectric transmitter
9 polarizing filter
10 liquid crystal
11 back lighting panel
12 electrode pad (e.g. TCF)
13 continuous electrode (e.g. TCF)
14 optically transparent non-conductive, filler material

FURTHER DESCRIPTION OF THE INVENTION

The present invention relates to ultrasonic scanning devices and display monitors. Information about an object that is in contact with the display monitor is gathered by means of ultrasonic energy. Ultrasonic energy is sent toward a surface of the display monitor where a pointing object may contact the display monitor. When the ultrasonic energy reaches the pointing object, at least some of the ultrasonic energy is reflected toward an ultrasonic energy receiver. The receiver detects the reflected energy, transmits a signal indicating that reflected energy was sensed. Using the transmitted signal, information about the object is determined. That information may include one or more of the following: (a) the location of the pointing object, (b) information about the texture of the surface of the pointing object, and/or information about the structure of features present in the pointing object, but which are not on the surface of the pointing object.

In one embodiment of the invention, an ultrasonic device is attached to a display monitor. For example, the ultrasonic device may be laminated to a portion of the display monitor. The combination of the ultrasonic device and the display monitor is referred to herein as a "touch screen display". The touch screen display may be used to determine the location of the pointing object at a first time, and then determine the location of the pointing object at a second time, in order to track movement of the pointing object and thereby cause a cursor to be displayed on the display monitor for purposes of identifying an image and thereby selecting an option (such as a software application) represented by the identified image.

The pointing object may include identifying characteristics which can be used to identify the owner of the pointing object. For example, the pointing object may be a finger, and the identifying characteristics may be the fingerprint. The touch screen display may be used to detect the fingerprint in order to identify the user of the touch screen display. In this manner, the touch screen display may be made available only to authorized users, or the touch screen display may be caused to display images in a manner that is believed to be preferred by that particular user. In this manner, the touch screen display may be personalized to a particular user's preferences.

The phrase "in-cell" touch screen display is used herein to refer to a touch screen display that has the ultrasonic device located within a group of elements that collectively make up a pixel of the display monitor. For example, each ultrasonic receiver is located among elements of the display monitor comprising a single pixel.

The phrase "on-cell" touch screen display is used herein to refer to a touch screen that has the ultrasonic device coupled to a surface of one of the layers that comprise the display monitor. For example, in such an on-cell touch screen display, the layer of the display monitor to which the ultrasonic device is attached may be a layer that is typically exposed, or may be an internal layer of the display monitor. For purposes of this disclosure, the phrase "out-cell" touch screen display is used to refer to a particular type of "on-cell" touch screen display, whereby the ultrasonic device is attached to a layer of the display monitor that is not internal to the display monitor, exclusive of any protective, scuff resistant surface layer of the display monitor.

The ultrasonic device may be an ultrasonic fingerprint imaging system, such as those that use an ultrasonic sensor to capture information about a fingerprint that can then be compared to previously obtained fingerprint information for identification purposes, and/or used to display a visible image of the fingerprint. The ultrasonic sensor transmits an ultrasonic pulse or collection of pulses, and then detects a reflected portion of the transmitted pulse(s). Such ultrasonic fingerprint imaging systems are relatively simple and reliable. An example of one such system is model 203 manufactured by the Ultra-Scan Corporation.

The ultrasonic device may employ a plurality of detectors to detect the energy reflected by the pointing object. Each detector may be individually calibrated to remove fixed pattern noise effects that may be characteristic of the components that make up the ultrasonic device, the display monitor, or both. These effects may include variations between the detectors that may arise from differences in the amplifiers, as well as variations arising from the manufacturing process (e.g. glue, contaminants, etc.) The variations in ultrasonic attenuation caused by variations between pixels of the display monitor will be detected as a non-changing portion of the fixed pattern noise received by the ultrasonic sensor, and such fixed pattern noise can be removed during analysis of the signals that are transmitted by the receiver to indicate that reflected energy was sensed by the receiver. Once the fixed pattern noise is removed, a "clean" signal is yielded that is representative of the surface being analyzed by the ultrasonic sensor.

The ultrasonic device may include an electronic control system that supplies timing signals. Some of these timing signals may be used to cause the ultrasonic device to emit an ultrasonic energy pulse. Others of these timing signals may be used in a process commonly referred to as "range gating" in which the a determination is made regarding which of the reflected ultrasonic energy that is detected by the ultrasonic device is related to the surface on which the pointing object may be placed. A discussion of range gating may be found in many reliable texts on sonar, radar, or ultrasonic non-destructive testing.

The timing signals, pulse generation initiation and TFT sensor signal readout that may then be further processed into an image of an object that is in contact with the protective plastic film platen.

Display monitors currently on the market include those that use light emitting diodes and liquid crystal displays for presenting a visible image to a user. Such display monitors are light-weight, thin, flat, reliable and inexpensive. When such a display monitor is combined with an ultrasonic device, the resulting touch screen display offers the ability to use a finger to point to an image on the display, and provide capabilities like those currently offered by touchpads used in conjunction with personal computers and personal digital assistants.

Having provided an overview of the invention, additional details will now be provided.

There is no requirement that the resolution of the display monitor and the resolution of the ultrasonic device must be the same. This allows for systems where, for example, the resolution of the display monitor may be 100 dots per inch and the ultrasonic device may be 10 dots per inch, or any other combination that is convenient to the application. In-Cell systems, however, put the receivers of the ultrasonic device within the 3-color group that comprises a color display monitor pixel, and thus the addition of an ultrasonic receiver to the 3-color display pixel components normally has a one-to-one receiver-to-pixel group relationship, but a one-to-one association is not required. For example, omission of ultrasonic receiver groups from some display monitor pixels would allow for different pitch spacing for the display monitor and ultrasonic device.

In an embodiment of an on-cell touch display with a piezoelectric imaging system coupled to an LCD display monitor is depicted in FIG. 1. To an edge-lit backlighting panel 11 is attached a piezoelectric film transmitter 8. On the surface of the backlighting panel 11 opposite to the piezoelectric transmitter 8, a TFT 6 on a glass substrate 7 is attached. Above this is a layer of liquid crystal material 10. Immediately above this is a transparent conductive film (TCF) layer 13 affixed to a color filter 5, the top of which also has a layer of conductive TCF 2. To this TCF layer 2 is a layer of piezoelectric polymer 3 (or copolymer). A pattern of individual TCF pads 2 is applied to the piezoelectric polymer layer 3 or alternately a polarizing filter 9, and the outer surface receives a layer of scuff resistant glass or plastic 1. The resulting touch screen display operates in a fashion like most LCD displays and a voltage between the TFT patterned TCF electrode [not explicitly shown but part of the TFT itself] on the TFT, and the continuous common plane electrode 13 allows each display pixel to turn on or off using light polarizers. If light that has been passed through a polarizing filter, then passes through a second polarizer oriented at 90 degrees to the first, the light will be blocked completely and will not pass through the second polarizer. The LCD display uses a fixed polarizing filter that is typically a sheet of plastic, the second polarizing filter is the liquid crystal material itself. If a voltage is applied, it polarizes the light thereby preventing light from being emitted, and if no voltage is applied light is permitted to pass. The ultrasound features come into play when the piezoelectric film transmitter issues an ultrasonic energy pulse. The ultrasonic energy pulse travels through the various layers to the exterior facing surface (in this case, the scuff resistant glass or plastic) where at least part of the ultrasonic energy pulse then reflects down again, bringing with it information about the ultrasonic impedance of the surface and any objects that are in contact with the surface. The reflected ultrasonic energy pulse is detected by the hydrophone array that is made up of the piezoelectric polymer film 3 and the two TCF electrode layers that contact it, both the continuous electrode 2 and the electrode array 12. Trace conductors interconnect the electrode array 2 with electronics (not shown) allowing the ultrasonic device to produce an transmit a signal corresponding to the individual ultrasonic signals associated with each ultrasonic array receiver element of the hydrophone array.

Figure 2:
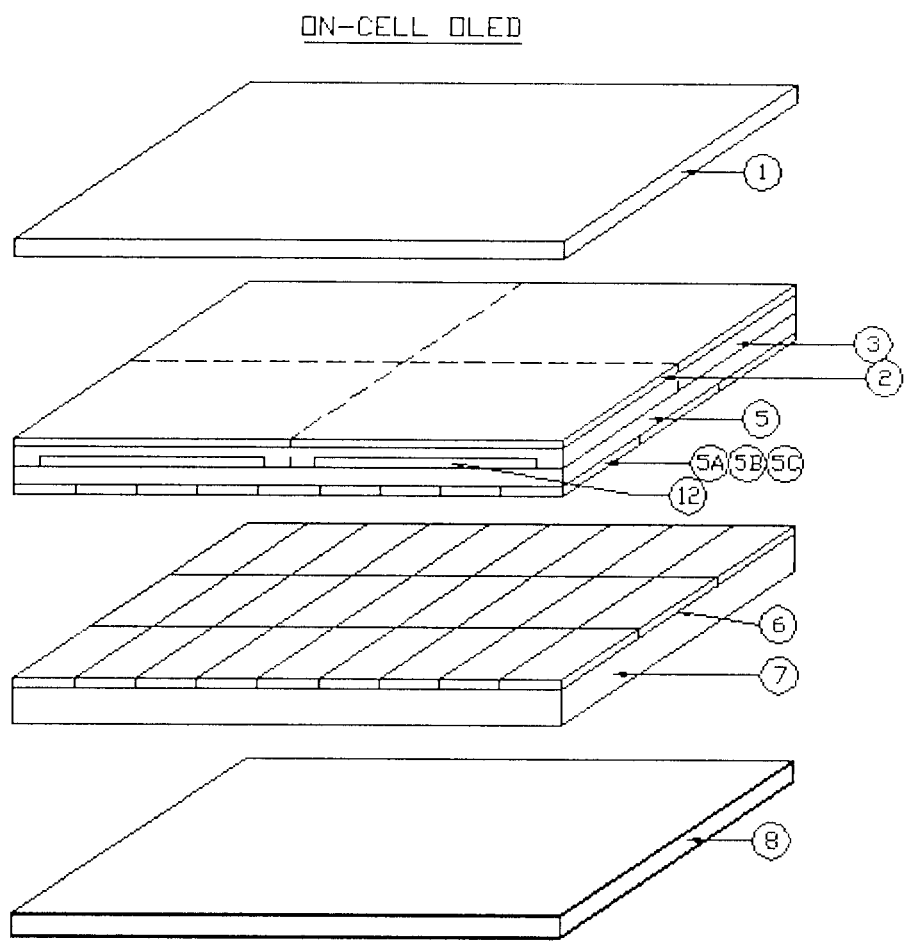
FIG. 2, which is an exploded view of a device in which an on-cell ultrasonic device has been integrated into an OLED display to create a touch screen display according to the invention.

FIG. 2 depicts an alternate embodiment of an On-Cell touch screen display. In that embodiment, the display's liquid crystal layer 10 and associated TCF electrodes associated with the display monitor are not needed. The backlight layer 11 is also not needed because the TFT display contains OLED elements that directly light up and illuminate the display. In this case the ultrasonic transmitter may be affixed to the back of the TFT substrate glass.

Figure 3:
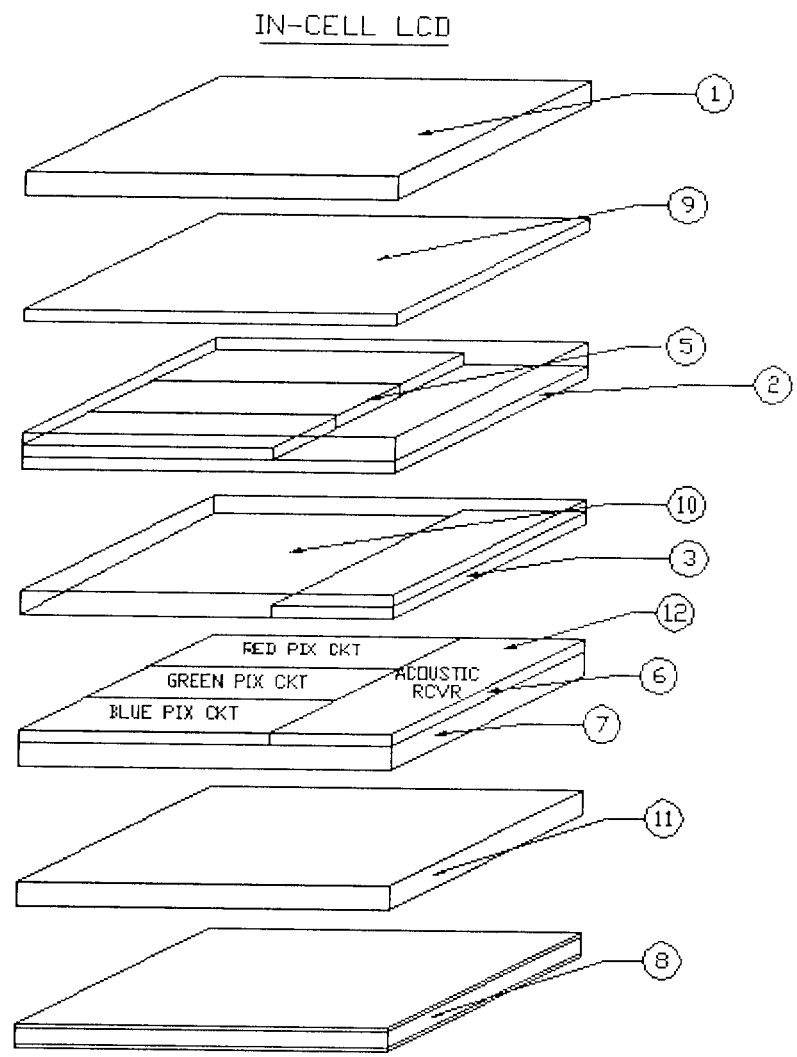
FIG. 3, which is an exploded view of a device in which an in-cell ultrasonic device has been integrated into a backlit LCD display to create a touch screen display according to the invention.

FIG. 3 depicts another embodiment of the invention. In this embodiment, the touch screen monitor is an in-cell touch display. To an edge-lit backlighting panel 11, is attached a piezoelectric film transmitter 8. On the surface of the backlighting panel 11 opposite to the piezoelectric transmitter 8, a TFT 6 on a glass substrate 7 is attached. This TFT 6 has many circuits. The individual pixels are groups of three LCD control amplifiers and one ultrasonic receiver circuit. The ultrasonic receiver further has a piezoelectric polymer bonded to it. Above this is a layer of liquid crystal material 10. Above this is a continuous electrode (TCF) 2 that is used as the common electrode for the receiver and as the common electrode for the LCD driver circuits. This TCF may be affixed to a color filter 5. The next layer up (in FIG. 3) in the stack is the polarizing filter 9 and finally the outer surface receives a layer of scuff resistant glass or plastic 1. This display operates in a fashion like most LCD displays and a voltage between the TFT patterned TCF electrode on the TFT and the continuous common plane electrode 2 allows each display pixel to turn on or off.

Figure 4:
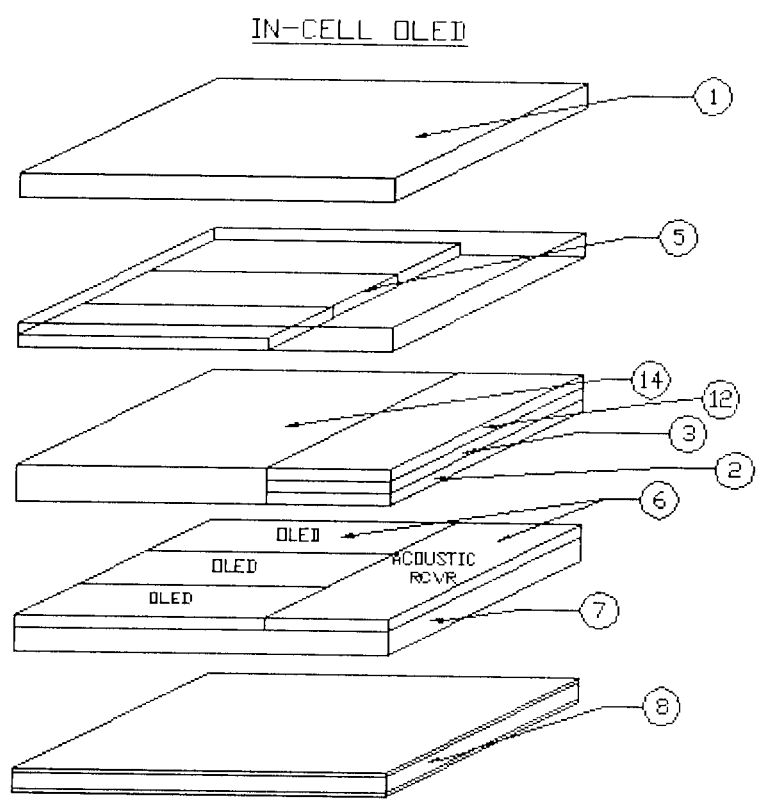
FIG. 4, which is an exploded view of a device in which an in-cell ultrasonic device has been integrated into an OLED display to create a touch screen display according to the invention.

Another embodiment of an in-cell touch display according to the invention is depicted in FIG. 4. To the back of the substrate of the TFT circuit 7, is attached a piezoelectric film transmitter 8. The TFT circuit 7 may be composed of groups of cells making up individual color pixels, each pixel being comprised of three light emitting cells and one ultrasonic sensor cell. Attached to the ultrasonic sensor cell TFT may be a three layer laminate that is composed of a TCF electrode 2, a layer of piezoelectric polymer 3, and another TCF film electrode 12 that is continuous across the TFT. Optically transparent insulating material 14 may be used above (in FIG. 4) the OLEDs to isolate them from the light emitting display circuits and the TCF 2. Shown in FIG. 4 above this is a color filter glass 5 to allow red-green-blue display color. A scuff resistant surface layer 1 protects the stack from physical abrasion and mechanical damage. It should be noted that although a one-to-one relationship between light pixel and ultrasonic sensor pixel is described, it would be easy to omit various sensor pixels to change the resolution of the ultrasonic device.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A touch screen display comprising:
a display monitor for providing a visual image; and
an ultrasonic device able to emit an ultrasonic energy wave, and able to detect reflected ultrasonic energy;
wherein the display monitor is comprised of layers, at least one of which is an internal layer, and the ultrasonic device includes a transducer comprised of at least one layer, and the ultrasonic transducer is attached to one of the internal layers of the display monitor; and
wherein the ultrasonic device is located among elements of the display monitor comprising a pixel, such that the pixel comprises a plurality of light emitting cells and the ultrasonic device.

2. The touch screen display of claim 1, wherein the display monitor includes organic light emitting diodes for providing the visual image.

3. The touch screen display of claim 1, wherein the display monitor includes a liquid crystal display for providing the visual image.

4. The touch screen display of claim 1, wherein the ultrasonic transducer includes a piezoelectric transmitter for emitting the ultrasonic energy wave.

5. The touch screen display of claim 1, wherein the ultrasonic transducer includes a piezoelectric hydrophone array for detecting reflected ultrasonic energy.

6. The touch screen display of claim 1, wherein the ultrasonic transducer includes a thin-film transistor receiver for detecting reflected ultrasonic energy.

7. The touch screen display of claim 1, wherein the ultrasonic device includes a plurality of receivers for detecting reflected ultrasonic energy.

8. The touch screen display of claim 7, wherein each ultrasonic energy receiver is located among elements of the display monitor comprising a pixel.

9. A touch screen display comprising:
a display monitor for providing a visual image; and
an ultrasonic device having a transducer able to emit an ultrasonic energy wave, and able to detect reflected ultrasonic energy;
wherein the ultrasonic transducer is located among elements of the display monitor comprising a pixel, such that the pixel comprises a plurality of light emitting cells and the ultrasonic device.

10. The touch screen display of claim 9, wherein the display monitor includes organic light emitting diodes for providing the visual image.

11. The touch screen display of claim 9, wherein the display monitor includes a liquid crystal display for providing the visual image.

12. The touch screen display of claim 9, wherein the ultrasonic transducer includes a piezoelectric transmitter for emitting the ultrasonic energy wave.

13. The touch screen display of claim 9, wherein the ultrasonic device includes a piezoelectric hydrophone array for detecting reflected ultrasonic energy.

14. The touch screen display of claim 9, wherein the ultrasonic transducer includes a thin-film transistor receiver for detecting reflected ultrasonic energy.

15. The touch screen display of claim 9, wherein the display monitor is comprised of layers and the ultrasonic transducer is comprised of at least one layer, and the ultrasonic transducer is attached to one of the layers of the display monitor.

16. The touch screen display of claim 9, wherein the ultrasonic device includes a plurality of receivers for detecting reflected ultrasonic energy.

17. The touch screen display of claim 1, wherein the ultrasonic transducer is attached to a liquid crystal layer of the display monitor.

18. The touch screen display of claim 1, wherein the ultrasonic transducer is attached to a color filter layer of the display monitor.

19. The touch screen display of claim 1, wherein the ultrasonic transducer is attached to a TFT substrate glass layer of the display monitor.

20. A method of determining information about a pointing object on a touch screen display comprising:
providing a display monitor for providing a visual image;
providing an ultrasonic device able to emit an ultrasonic energy wave, and able to detect reflected ultrasonic energy;
wherein the display monitor is comprised of layers, at least one of which is an internal layer, and the ultrasonic device includes a transducer comprised of at least one layer, and the ultrasonic transducer is attached to one of the internal layers of the display monitor; and
wherein the ultrasonic device is located among elements of the display monitor comprising a pixel, such that the pixel comprises a plurality of light emitting cells and the ultrasonic device;
providing a visual image using the display monitor;
emitting an ultrasonic energy wave using the ultrasonic device;
detecting reflected ultrasonic energy using the ultrasonic device; and
determining information from the reflected ultrasonic energy.

21. The method of claim 20, wherein the display monitor includes organic light emitting diodes for providing the visual image.

22. The method of claim 20, wherein the display monitor includes a liquid crystal display for providing the visual image.

23. The method of claim 20, wherein the ultrasonic transducer includes a piezoelectric transmitter for emitting the ultrasonic energy wave.

24. The method of claim 20, wherein the ultrasonic transducer includes a piezoelectric hydrophone array for detecting reflected ultrasonic energy.

25. The method of claim 20, wherein the ultrasonic transducer includes a thin-film transistor receiver for detecting reflected ultrasonic energy.

26. The method of claim 20, wherein the ultrasonic device includes a plurality of receivers for detecting reflected ultrasonic energy.

27. A touch screen display comprising:
a means for providing a visual image; and
a means for emitting an ultrasonic energy wave, and detecting reflected ultrasonic energy;
wherein the means for providing a visual image is comprised of layers, at least one of which is an internal layer, and the means for emitting and detecting includes an ultrasonic transducer comprised of at least one layer, and the ultrasonic transducer is attached to one of the internal layers of the means for providing a visual image; and
wherein the means for emitting and detecting is located among elements comprising a pixel of the means for providing a visual image, such that the pixel comprises a plurality of light emitting cells and the means for emitting and detecting.

28. The touch screen display of claim 27, wherein the means for providing an image includes organic light emitting diodes for providing the visual image.

29. The touch screen display of claim 27, wherein the means for providing an image includes a liquid crystal display for providing the visual image.

30. The touch screen display of claim 27, wherein the means for emitting and detecting includes a piezoelectric transmitter for emitting the ultrasonic energy wave.

31. The touch screen display of claim 27, wherein the ultrasonic transducer includes a piezoelectric hydrophone array for detecting reflected ultrasonic energy.

32. The touch screen display of claim 27, wherein the ultrasonic transducer includes a thin-film transistor receiver for detecting reflected ultrasonic energy.

33. The touch screen display of claim 27, wherein the means for emitting and detecting includes a plurality of receivers for detecting reflected ultrasonic energy.

* * * * *